May 19, 1925.  1,538,633
H. K. GOODRICH
SNOW ATTACHMENT FOR AUTOMOBILES
Filed July 19, 1922    2 Sheets-Sheet 1
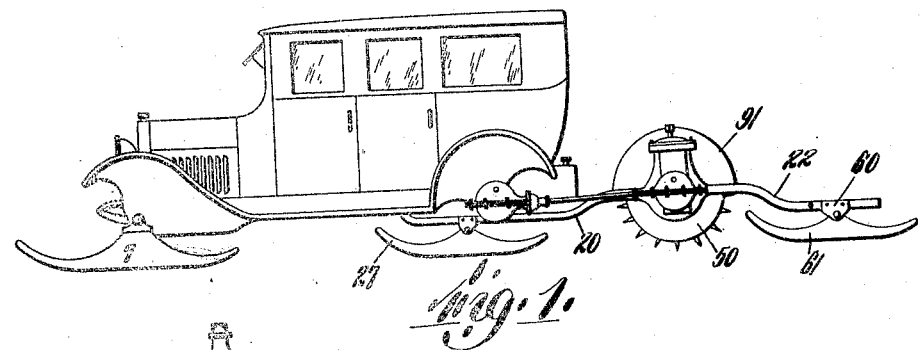
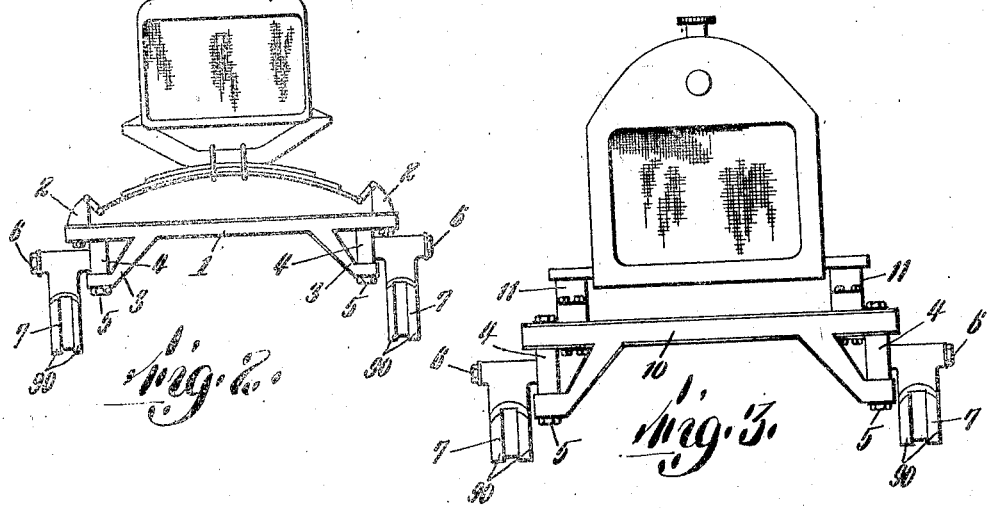
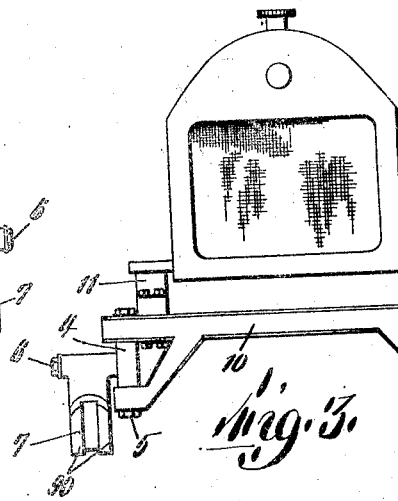
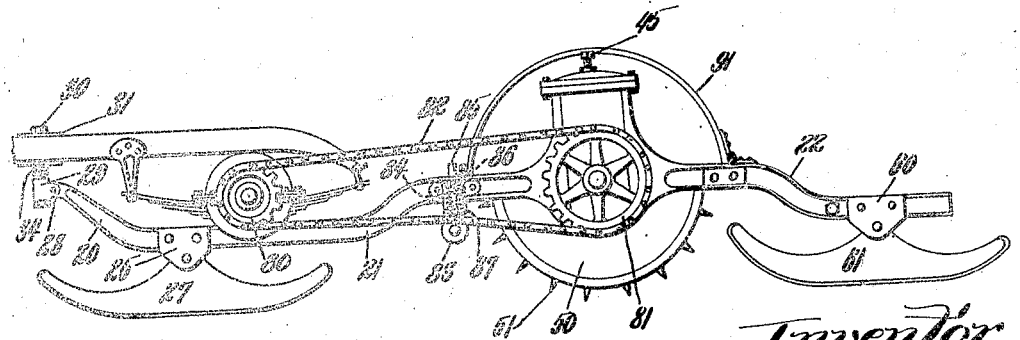
Inventor
Harold K. Goodrich

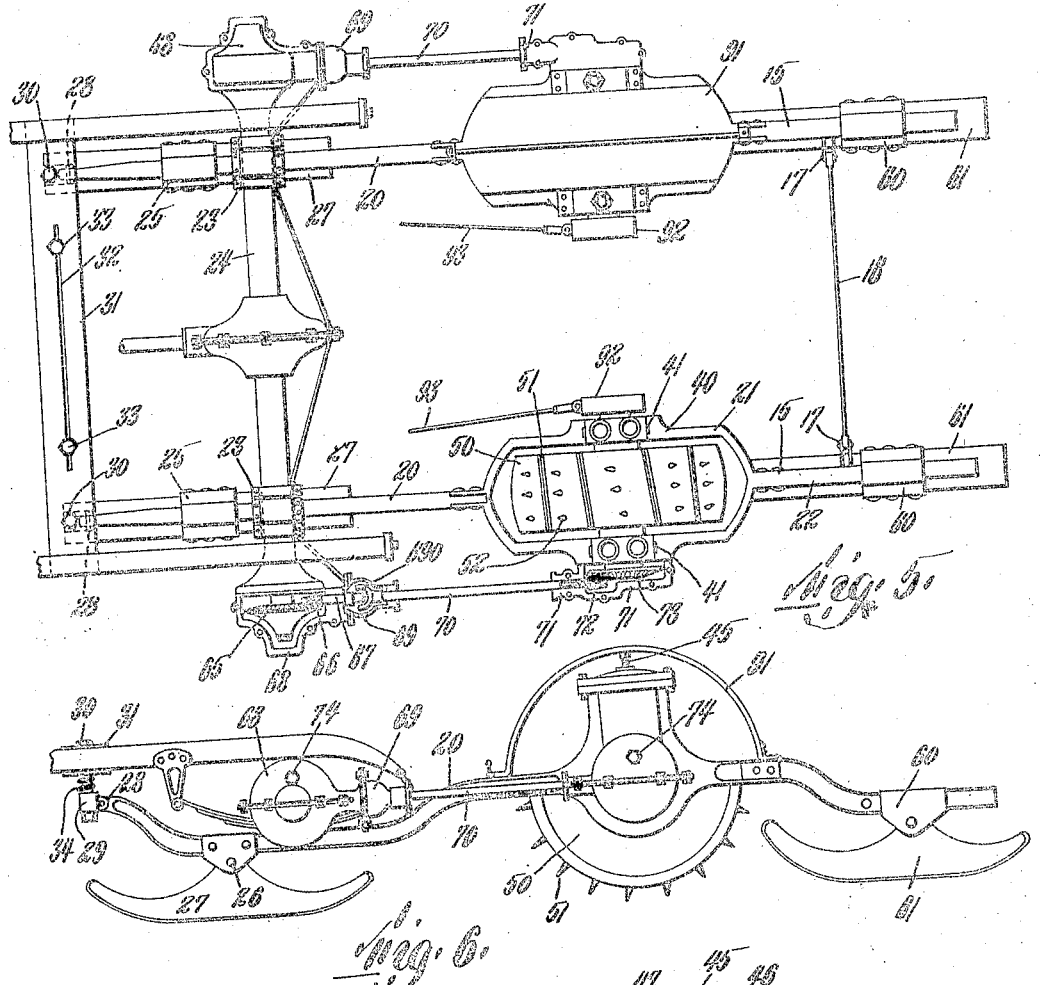

Patented May 19, 1925.

1,538,633

UNITED STATES PATENT OFFICE.

HAROLD K. GOODRICH, OF BENSON, VERMONT.

SNOW ATTACHMENT FOR AUTOMOBILES.

Application filed July 19, 1922. Serial No. 575,978.

*To all whom it may concern:*

Be it known that I, HAROLD K. GOODRICH, a citizen of the United States, residing at Benson, in the county of Rutland and State of Vermont, have invented new and useful Improvements in Snow Attachments for Automobiles, of which the following is a specification.

This invention relates to attachments for automobiles by which they may be converted into motor sleds supported on runners instead of wheels and propelled by the automobile power plant.

For this purpose this invention provides a pair of units arranged in parallel relation, each unit comprising a plurality of runners and a traction wheel in place of the usual driving wheels for supporting the rear of the vehicle, driving connections being provided from the rear drive axle for the traction wheels. Steering runners are provided for the forward end of the vehicle, these runners being controlled by the vehicle steering mechanism.

For a more complete understanding of this invention, together with further objects and advantageous details and combinations of parts, reference may be had to the accompanying drawings in which—

Figure 1 is a side elevation of a motor vehicle having the attachment in place thereon.

Figure 2 is a front view of an automobile of the cross spring type showing the front axle construction.

Figure 3 is a similar view of a vehicle of the longitudinal spring type showing the front axle construction.

Figure 4 is a detail side elevation of the rear portion of the attachment showing a modified drive.

Figure 5 is a plan partly broken away of the rear axle attachment of the form of drive shown in Figure 1.

Figure 6 is a view similar to Figure 4 also showing the drive mechanism of Figures 1 and 5.

Figure 7 is a detail with parts broken away of the drive connection.

Referring particularly to Figure 1 it may be seen that the attachment comprises runner supports for the front and rear portions of the vehicle. Two constructions of front runner support for the steering runners are shown in Figures 2 and 3, in Figure 2 the construction being designed for the single cross spring type of vehicle such as Ford cars, while that in Figure 3 is designed for cars having longitudinal front springs.

Referring more particularly to Figure 2 at 1 is shown a cross axle member corresponding to the front axle of the vehicle when provided with wheels. This member 1 is similar to the ordinary front axle except that it is preferable to make it somewhat shorter. The normal distance between the centers of the tread for vehicle wheels is sixty inches, while it is preferable to space the center lines of the runners apart forty inches so as to track the ordinary sleigh. For this purpose it is necessary to place the spring-supporting brackets 2 nearer the ends of the member 1 than their position on the ordinary axle. The member 1 is provided with downwardly and outwardly extending arms 3 between which and the main portion of the member 1 are journaled the sleeves 4 on pivot bolts 5, these sleeves carrying rocker bolts 6 on which the forward runners 7 are pivoted. This permits a rocking motion of the runners about the bolts 6 as centers so that they may conform to irregularities in the roadway. The sleeves 4 are intended to be connected to the ordinary steering gear of the vehicle in the ordinary manner so that the runners may be swung about the bolts 5 as centers to steer the vehicle.

In Figure 3 a member 10 is shown corresponding to the member 1 of Figure 2 and taking the place of the usual front axle in that type of vehicle employing longitudinal springs. The longitudinal springs shown at 11 are made fast thereto in the same manner in which they would be made fast to the vehicle axle. This member 10 similarly is provided with pivot bolts 5 for the reception of sleeves 4 carrying rocker bolts 6 on which the runners 7 are supported, the sleeves 4 being connected in the usual manner to the steering mechanism of the vehicle.

The rear portion of the vehicle is supported by a pair of units. As shown more particularly in Figure 5 these units comprising frame members 15 are spaced apart adjacent their rear ends by means of a link 16, the ends of which have pivotal connections at 17 to the frame members. The forward ends of these members may be similarly joined, if desired, though it is preferable, particularly when used on cars having rear gasoline tanks to connect them to the vehicle body forwardly of the rear axle to prevent undue vertical movement of the units such as might cause the gasoline tank to be struck thereby which might be liable to puncture or otherwise injure it. Each unit 15 may, if desired, be made in three sections as shown, a forward section 20, an intermediate section 21, and a rear section 22. The forward section 20 has integral therewith or attached thereto a housing or sleeve portion 23 engaging over the rear axle housing between its ends, the sleeves of the two units being preferably spaced so as to bring the runner supports therefor, which will be later described, forty inches between centers the same as the runners for supporting the forward end of the vehicle. These sleeve portions are so mounted as to be capable of rocking on the rear axle housing, but are preferably prevented, by any suitable means, from lengthwise motion relative thereto. Somewhat forwardly of the rear axle housing, as indicated at 24, each section 20 carries a depending bracket 25, through the lower end of which passes a cross pivot bolt 26 on which is rockingly mounted a forward runner 27.

In the cases where the sections 20 are to be attached to the vehicle body, this may be done by means such as shown in Figures 4, 5, and 6, each section 20 there being shown as pivoted at its forward end at 28 to a sleeve 29 slidable on a vertical bolt 30 fixed near one end to a cross frame member 31. This cross frame member is fixed to the vehicle chassis or body and may be made extensible, if desired, so as to fit bodies or the chassis of various widths. The term "body" as herein used is therefore intended to include either the body proper, or the chassis, or both. As shown a slot 32 is formed therein in which may be adjustably positioned securing bolts 33 for attaching it to the vehicle. The head of the bolt 30 is preferably beneath the sleeve 29 and a spring 34 may be placed between the upper face of the sleeve 29 and the lower face of the cross frame member 31. By this means the sleeve 29 is held yieldingly spaced from the lower surface of the vehicle and the outer end of the unit is prevented from rising so far as to endanger the gasoline tank by the impingement of the sleeve 29 on the head of the bolt 30.

The intermediate section 21 of each unit is preferably formed of a pair of sections 40 spaced apart intermediate their ends to form a vertical slot through the section bounded by spaced sides. Each portion 40 intermediate its ends is shown as having an upwardly and slightly forwardly inclined guideway 41 therein for the reception of a journal box 42 and a spring plate 43 located above the journal box. Springs 44 are placed between the upper face of the journal box and the spring plate 43 and urge the journal box toward its lower limit of motion in the frame members 40 by a tension adjustable by means of a cap bolt 45 extending through a top cover member 46 bridging the opposite sides of the guideway 41 and bearing at its lower end in a depression 47 in the upper face of the spring plate. The journal boxes 42 have journaled therein a shaft 48 extending laterally of the unit which carries intermediate the spaced side portions of the frame member 21, a traction wheel 50 which is provided with suitable calks and spuds indicated at 51 and 52 to enable the wheel to exert tractive effort against a smooth surface such as snow or ice. The rear ends of each pair of frame members 21 are made fast to the forward end of the rear end section 22 which end section is provided with a depending bracket 60 on which is rockingly supported a rear runner 61, the runners 27 and 61 being in alinement lengthwise of the unit and the traction wheel 50 bearing against the road surface between these runners.

It is intended that each traction wheel shall be driven from the motor vehicle power plant and for this purpose means are provided for connecting each traction wheel to the corresponding end of the rear driving axle of the vehicle. One form of construction which may be utilized is shown in Figure 1 and more in detail in Figures 5, 6, and 7. Referring to these latter figures the end of the live driving axle has made fast thereto a bevel gear 65 and in mesh therewith is a bevel pinion 66 on the forward end of a short shaft 67. This shaft is journaled in a casing 68 which covers the two bevel gears 65 and 66 and furnishes a closed casing for the outer end of the live axle section which may be filled with lubricant such as oil or grease. The rear end of this casing, as shown, comprises a housing 69 for a universal joint 690 which connects the rear end of shaft 67 to a shaft 70. The rear end of the shaft 70 is journaled in a casing 71, which serves to house a beveled pinion 72 carried on the rear end of the shaft 70 and a bevel gear 73 meshing therewith fixed to the outer end of the shaft 48. This housing also furnishes means for containing oil or grease for lubricating the gears therein and the transverse shaft, the housing being made fast to the outer face of the outer journal box 42. For the purpose of placing lubricant in the housings 68 and 71 they are shown as provided with holes normally closed by threaded plugs 74 (see Figure 6). The provision of a universal joint in this drive connection permits the traction wheel to follow the inequalities of the road, the shaft journal box playing up and down within the guides 41 without interrupting the driving connections.

Where it is desired to employ a chain drive for the traction wheel this may be readily accomplished as shown in Figure 4 in which each end of the live axle of the vehicle carries a sprocket gear 80 in place of the bevel gear 65 and the outer end of the shaft 48 carries a sprocket wheel 81. These gears are connected by a drive chain 82 and in order to take up the slack of the chain, a certain amount of slack being necessary to provide for the up and down play of the wheel 81 as the journal boxes 42 move up and down in their guide slots, a take-up device is provided. This device may comprise a flanged roller 83 over which the chain 82 passes and which is normally urged upwardly against the lower face of the chain by means of a spring 84 surrounding a rod 85 to the lower end of which the pinion 83 is journaled and which reacts between a collar 86 made fast to the rod 85 near its upper end and a fixed bracket member 87 through which this rod slidably passes.

In order that the various runners may bear firmly on the roadway without danger of slipping sideways it is preferable to construct them with a pair of spaced ribs or runner surfaces as shown at 90 and in order that the traction wheels may properly function it is desirable that they be constructed in the form of closed drums so that they may not be clogged by snow or ice and having the traction elements on their outer surfaces. It is also preferable to place over each traction element a suitable fender or casing as shown at 91.

Means are also provided whereby the traction wheels are susceptible of control by the vehicle brake mechanism. For this purpose the inner end of each shaft 48 is shown as provided with a brake drum for the reception of a band brake indicated at 92 and from which operative connections as cables 93 may extend to the brake mechanism of the vehicle to be operated by the driver in the same manner as the wheel brakes used when the vehicle is run as an ordinary road vehicle.

Having thus described certain embodiments of this invention it is evident that many changes and modifications might be made therein without departing from its spirit or scope as defined by the appended claims.

I claim:

1. A device of the class described comprising a pair of frame members, runners positioned at each end of each member, a traction wheel carried by each member between said runners, means for supporting the rear axle housing of a motor vehicle from said members, and driving connections from the rear axle of said vehicle to said traction wheels.

2. In a device of the class described, a unit for supporting a vehicle chassis, said unit comprising a frame member having a supporting runner pivoted thereto adjacent each end, and a traction driving member carried by said frame member between said runners.

3. In a device of the class described, a unit for supporting a vehicle chassis, comprising a frame member, a supporting runner fixed thereto adjacent each end, said frame member having a substantially vertical opening therethrough between said runners, and a traction-propelling element carried in said opening.

4. In a device of the class described, a unit for supporting a vehicle chassis, comprising a frame member, a supporting runner fixed thereto adjacent each end, said frame member having a substantially vertical opening therethrough between said runners, and a traction wheel journaled in said opening on an axis extending laterally of said member.

5. In a device of the class described, a unit for supporting a vehicle chassis, comprising a frame member, a supporting runner fixed thereto adjacent each end, said frame member having a substantially vertical opening therethrough between said runners, a traction wheel carried in said opening, and means for urging said wheel against the ground between said runners.

6. In a device of the class described, a unit for supporting the chassis of a motor vehicle having a driving axle, which comprises a frame member, runners for supporting each end of said frame member, a driving traction element carried by said frame member, and driving connections between said driving axle and said element.

7. In a device of the class described, a unit for supporting a motor vehicle having a driving axle and brake applying means, which comprises a frame member, runner supports for said frame member, said member having spaced sides between said runner supports, a shaft passed through said sides, a traction wheel fixed to said shaft between said sides, a brake drum fixed to said shaft at one side of said frame, a brake in operative relation to said drum and actuated by said brake applying means, and driving connections to the opposite ends of said shaft from said driving axle.

8. In a device of the class described, a unit for supporting a motor vehicle having a driving axle, which comprises a frame member, runner supports for said member, said member having spaced sides between said runner supports, journal blocks spring supporting said sides, a shaft journaled in said blocks, a traction wheel fixed to said shaft, and driving connections from said axle to said shaft.

In testimony whereof I have affixed my signature.

HAROLD K. GOODRICH.